United States Patent
Thomas et al.

(10) Patent No.: US 9,526,984 B2
(45) Date of Patent: Dec. 27, 2016

(54) GAMIFICATION PROVIDER ABSTRACTION LAYER

(71) Applicant: ORACLE INTERNATIONAL CORPORATION, Redwood Shores, CA (US)

(72) Inventors: Jayant Thomas, San Ramon, CA (US); Victor Matskiv, Walnut Creek, CA (US); Zhaogang Qian, Acton, MA (US); Vallabha Jagdish, San Ramon, CA (US); Richard Rhodes, S Easton, MA (US); Vasanthan Gunaratnam, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 330 days.

(21) Appl. No.: 14/086,022

(22) Filed: Nov. 21, 2013

(65) Prior Publication Data
US 2015/0141149 A1     May 21, 2015

(51) Int. Cl.
| G06F 17/00 | (2006.01) |
| A63F 13/30 | (2014.01) |
| A63F 13/85 | (2014.01) |
| A63F 13/60 | (2014.01) |
| A63F 13/352 | (2014.01) |

(52) U.S. Cl.
CPC .............. *A63F 13/30* (2014.09); *A63F 13/352* (2014.09); *A63F 13/60* (2014.09); *A63F 13/85* (2014.09)

(58) Field of Classification Search
CPC .......... A63F 13/12; A63F 13/30; A63F 13/79; A63F 13/85; G06Q 10/06; G06Q 10/0631; G06Q 10/06311; G06Q 10/10; G06Q 50/01; G06Q 99/00; G06F 19/3418
See application file for complete search history.

(56) References Cited

U.S. PATENT DOCUMENTS

| 2004/0180721 A1* | 9/2004 | Rowe .................... G06F 8/65 463/42 |
| 2012/0270661 A1 | 10/2012 | Smith et al. |
| 2013/0079128 A1 | 3/2013 | Thomas et al. |
| 2013/0291065 A1 | 10/2013 | Jakowski et al. |

* cited by examiner

*Primary Examiner* — Lawrence Galka
(74) *Attorney, Agent, or Firm* — Miles & Stockbridge P.C.

(57) ABSTRACT

A system that manages a gamification provider abstraction layer can select a gamification provider. The system receives a common gamification request message from a client and creates a provider-specific request message based on the received common gamification request message and the selected gamification provider. The system then transmits the provider-specific request message to the selected gamification provider.

20 Claims, 10 Drawing Sheets

| Behavior Service Concept | Badgeville Provider Concept | Comment |
| --- | --- | --- |
| Gamespace | Network | Any level 1 gamespaces (directly under root gamespace) will be mapped to Badgeville network |
| Gamespace | Site | Any level N > 1 gamespaces will be mapped to Badgeville sites. The sites will be created from template. |
| User | User/Player | Behavior service requires users to be registered at their respective level 1 gamespaces (top level private customer gamespaces). Top level 1 registrations are mapped to Badgeville users. |
| Activity | Behavior | Individual activity properties are mapped to identical behavior properties as is, without any property name/value translations. |

GAMIFICATION PROVIDER ABSTRACTION LAYER

FIELD

One embodiment is directed generally to a computer system, and in particular to a computer system that manages a gamification provider abstraction layer.

BACKGROUND INFORMATION

Gamification is the use of game thinking, game mechanics, reputation mechanics, and/or social mechanics in a non-game context to engage users and/or solve problems. Gamification can be used in applications and processes to improve user engagement, return on investment, data quality, timeliness, and learning. Gamification techniques strive to leverage people's natural desires for competition, achievement, status, self-expression, altruism, and closure.

One gamification strategy is rewards for players who accomplish desired tasks. Types of rewards include points, achievement badges or levels, the filling of a progress bar, and providing the user with virtual currency. Competition is another element of games that can be used in gamification. Making the rewards for accomplishing tasks visible to other players or providing leader boards are ways of encouraging players to compete.

Another approach to gamification is to make existing tasks feel more like games. Some techniques used in this approach include adding meaningful choice, onboarding with a tutorial, increasing challenge, and adding narrative.

SUMMARY

One embodiment is a system that manages a gamification provider abstraction layer. The system selects a gamification provider. The system receives a common gamification request message from a client and creates a provider-specific request message based on the received common gamification request message and the selected gamification provider. The system then transmits the provider-specific request message to the selected gamification provider.

BRIEF DESCRIPTION OF THE DRAWINGS

FIG. 4 illustrates an example mapping between the common gamification API of FIG. 3 and the gamification provider Badgeville in accordance with one embodiment.

DETAILED DESCRIPTION

One embodiment is a system that manages gamification services by providing a gamification provider abstraction layer that enables client applications, such as enterprise applications, to interact indirectly with a selected gamification (or "behavior service") provider, such as "The Behavior Platform" by Badgeville, Inc. ("Badgeville") and "Nitro" by Bunchball, Inc. ("Bunchball"). The abstraction layer provides gamification services to the enterprise applications without requiring direct interaction between the applications and any particular gamification provider. The applications communicate with the system according to a common application programming interface ("API") provided by the abstraction layer, which allows the system to change the selected gamification provider without requiring changes to the enterprise applications. The system transforms sensitive data before transmitting data to the selected gamification provider, such as obfuscating sensitive data and/or de-identifying personal identification/medical data. The system provides unique gaming namespaces, "gamespaces," in which applications can capture user behaviors and collect rewards. Gamespaces can be limited to a single application or shared across applications, and applications can access multiple gamespaces.

In one embodiment, the system receives requests from applications according to a common API and transforms the common requests into provider-specific requests. The system transmits the provider-specific requests to the selected gamification provider and receives provider-specific responses. The provider-specific responses are transformed into common responses and sent to the requesting application.

Figure 1:
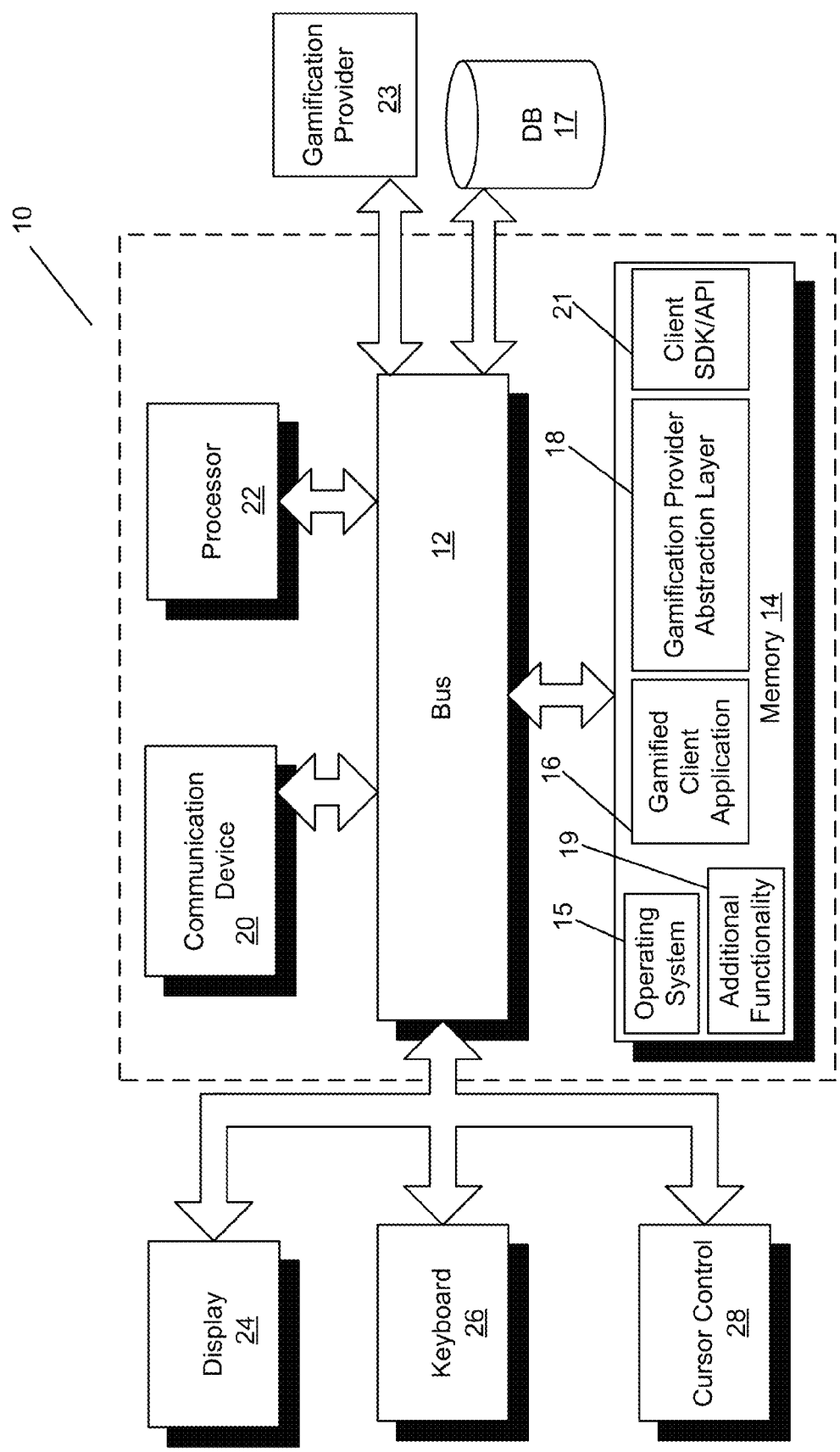
FIG. 1 is a block diagram of a computer system that can implement an embodiment of the present invention.

FIG. 1 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a gamification provider abstraction layer 18 that provides a common gamification API, as disclosed in more detail below. The modules further include a Client SDK/API that can be used by client applications, such as gamified client application 16, to interact with gamification provider abstraction layer 18. Client application 16 can be executed locally on system 10 or remotely on a second system, such as a mobile device, and connect to gamification provider abstraction layer 18 through a network or any other method. Gamified client application 16 that interacts with gamification provider abstraction layer 18 to provide behavior collection services for the end-users of application 16. Examples of gamified client application 16 include web applications, desktop applications, and mobile applications, or "apps," etc. Examples of gamified client application 16 further include enterprise applications such as the following applications from Oracle Corp.: the "Argus" product family, the "Health Management Platform Solution," the "InForm" product family, the "Mobile Clinical Research Associate" application ("Mobile CRA"), or a Customer Relationship Management ("CRM") application. System 10 can be part of a larger system, such as an enterprise resource planning ("ERP") system. Therefore, system 10 will typically include one or more additional functional modules 19 to include the additional functionality. A database 17 is coupled to bus 12 to provide centralized storage for modules 16, 18, and 19 and store behavior information, gamespace definitions, etc.

In one embodiment, system 10 receives a common gamification request at gamification provider abstraction layer 18, such as a request to register a user behavior, from client application 16 and creates a provider-specific request based on the common request. Gamification provider abstraction layer 18 transmits the provider-specific request to gamification provider 23 (e.g., Badgeville, Bunchball, etc.) and receives a provider-specific response. Gamification provider abstraction layer 18 creates a common response based on the provider-specific response and transmits the common response to client application 16. In some embodiments, client application 16 can be running on a separate system and communicate with gamification provider abstraction layer 18 via a network, such as a local area network ("LAN"), wide area network ("WAN"), the Internet, etc. For example, client application 16 can be a mobile "app" running on a personal digital assistant ("PDA") or smartphone.

In some embodiments, when creating the provider-specific request, system 10 de-identifies any personal identification data and/or medical data before adding such data to the provider-specific request. In some embodiments, when creating the provider-specific request, system 10 de-identifies any personal identification data for users who have not opted-in before adding such data to the provider-specific request. Therefore, system 10 can be compliant under the Health Insurance Portability and Accountability Act of 1996 ("HIPAA").

In some embodiments, system 10 comprises a common representational state transfer ("REST") interface between client applications and gamification providers that provide implementations for tracking and gamifying user behaviors, such as Badgeville, Bunchball, etc. For example, system 10 can include modules for accessing Badgeville and Bunchball as gamification providers.

Some embodiments provide security and authentication models, such as token-based authentication and credentials-based (username and password) authentication.

In some embodiments, gamification provider abstraction layer 18 can be an abstraction on top of features provided by various gamification, or behavior, service providers. Features provided by behavior/gamification providers can be abstracted using the concept of a gamespace, as described herein.

Figure 2:
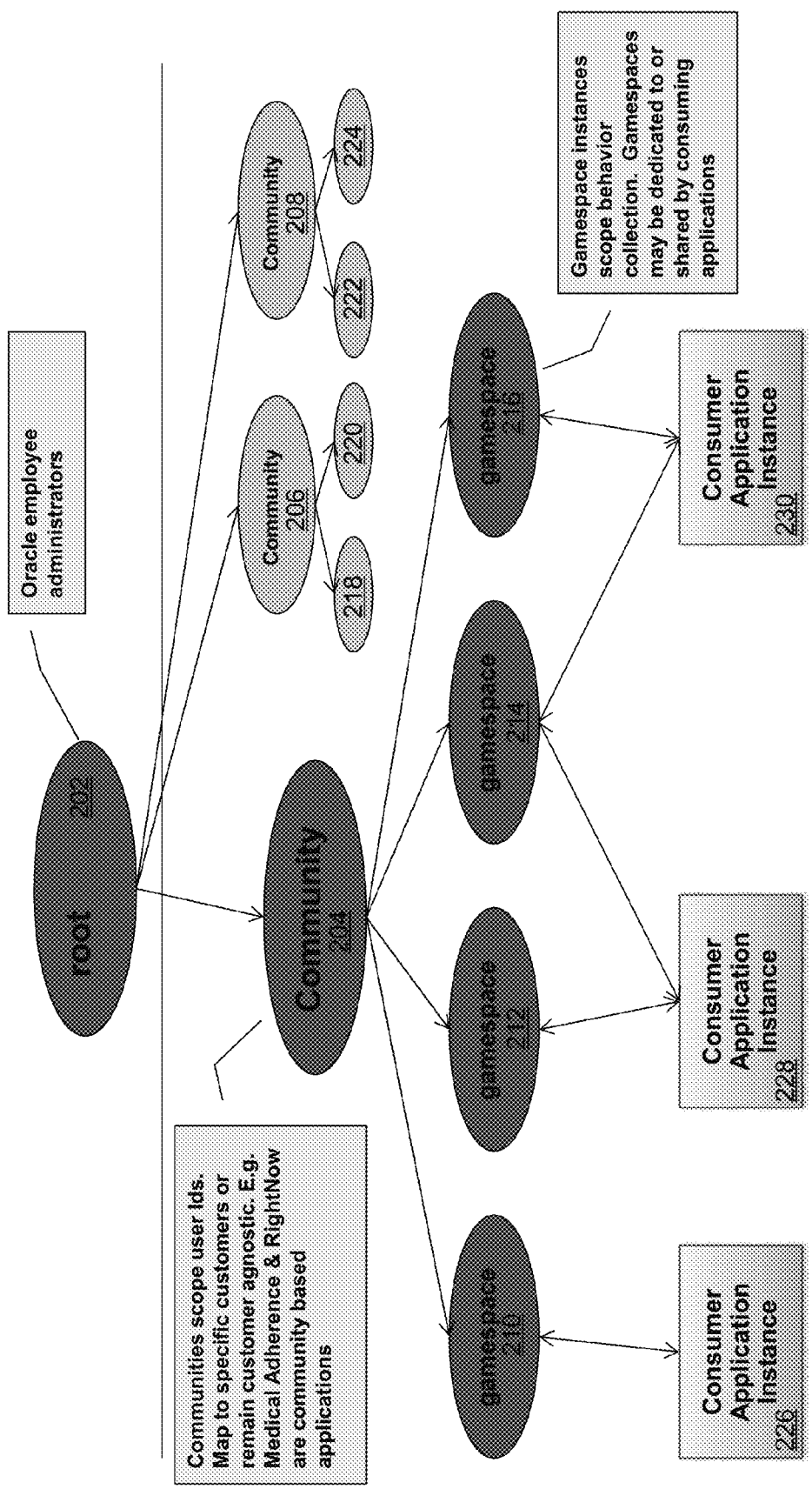
FIG. 2 illustrates a gamespace hierarchy in accordance with one embodiment.

FIG. 2 illustrates a gamespace hierarchy in accordance with one embodiment. Gamespaces are game namespaces where users can, for example, participate in gaming activities, collect points, and get rewards. Gamespaces can be standalone or form tree-based hierarchies. A gamespace can have one parent node across all hierarchies.

In some embodiments, gamespaces can have different access types. For example, a public gamespace can be accessible without registration, while a private gamespace can be accessible only by users registered in that gamespace. In another example, a gamespace with inherited access can be accessible by users who have access to that gamespace's parent.

In some embodiments, gamespaces with private access type require explicit player registration (i.e., existing users (hosted and on-premises) should register with the gamespace first before using it).

In some embodiments, users can be categorized as hosted or on-premises. For example, on-premises users can include users who access gamification provider abstraction layer 18 via a product installed on a third party system, whereas hosted users include users who access gamification provider abstraction layer 18 via a product hosted off-site, such as a cloud-based product, a SaaS product, etc.

In embodiments, before a gamespace can be used, the gamespace is created using a create gamespace request, such as the create new gamespace API 302 described in FIG. 3 below. In some embodiments, API 302 can be invoked by a REST client using client credentials. In some embodiments, among other parameters, the API 302 can allow for gamespace template name to be provided. For example, gamespace templates defining a set of allowed behaviors/activities can be used during gamespace creation to facilitate the creation of similarly structured gamespaces.

Referring again to FIG. 2, in one embodiment, public root gamespace 202 is a predefined gamespace and is at the top of the hierarchy. Community gamespace 204, community gamespace 206, and community gamespace 208 are top-level private gamespaces. Gamespaces 210-216 are gamespaces for community 204's gamified products, consumer application instances 226-230.

In embodiments, clients can create their respective top-level private gamespaces directly under public root gamespace 202, such as top-level private gamespaces 204, 206, and 208. Privacy restrictions can be enforced such that users of private gamespace 204 and its descendants cannot access private gamespace 206 and its descendants, and vice versa. In some embodiments, gamespaces 204 and 206 can be a container gamespace or a mixed gamespace.

For example, in some embodiments, container gamespaces do not define their own behaviors (e.g., clients cannot invoke behavior-related APIs within a container gamespaces and cannot engage in a game using the container gamespace). In such embodiments, container gamespaces can be used as a parent to, for example, provide common access permission for its sub-gamespaces. In some embodiments, the container gamespaces do not need to be mapped to any artifact on the gamification provider's side, unless the provider supports a similar container-type gamespace concept.

In some embodiments, mixed gamespaces can be used as a parent to, for example, provide common access permission for its sub-gamespaces like container gamespaces, and also support behavior activities at the same time. For example, in some embodiments, mixed gamespaces can have properties of both container gamespaces and product gamespaces.

In embodiments, product gamespaces can be created with the inherited access type under a top-level private gamespace for gamified products (e.g., products with gamification support), and examples of such product gamespaces are provided as gamespaces 210, 212, 214, and 216. The inherited access type allows users of the parent gamespace to access the child gamespace with inherited access type.

In some embodiments, gamespaces can include product features and the same hierarchical inherited access rules can apply to product features having dedicated behavior support. For example, product features may define their own sub features in a hierarchical manner similar to the manner in which gamespaces can be hierarchically defined. In such examples, inheritance rules can apply to the featute/sub-feature hierarchy of a product feature heirarchy. For example, product feature XYZ can have sub-features X, Y and Z for which gamification is enabled, and it is possible to configure respective gamespaces as follows: clients of feature XYZ will have access to all sub-features X, Y and Z; or clients of sub-feature X do not have access to sub-features Y and Z and vice versa. In some embodiments, gamespaces need not be restricted to single clients/products and can be shared across products and/or clients.

Figure 3:
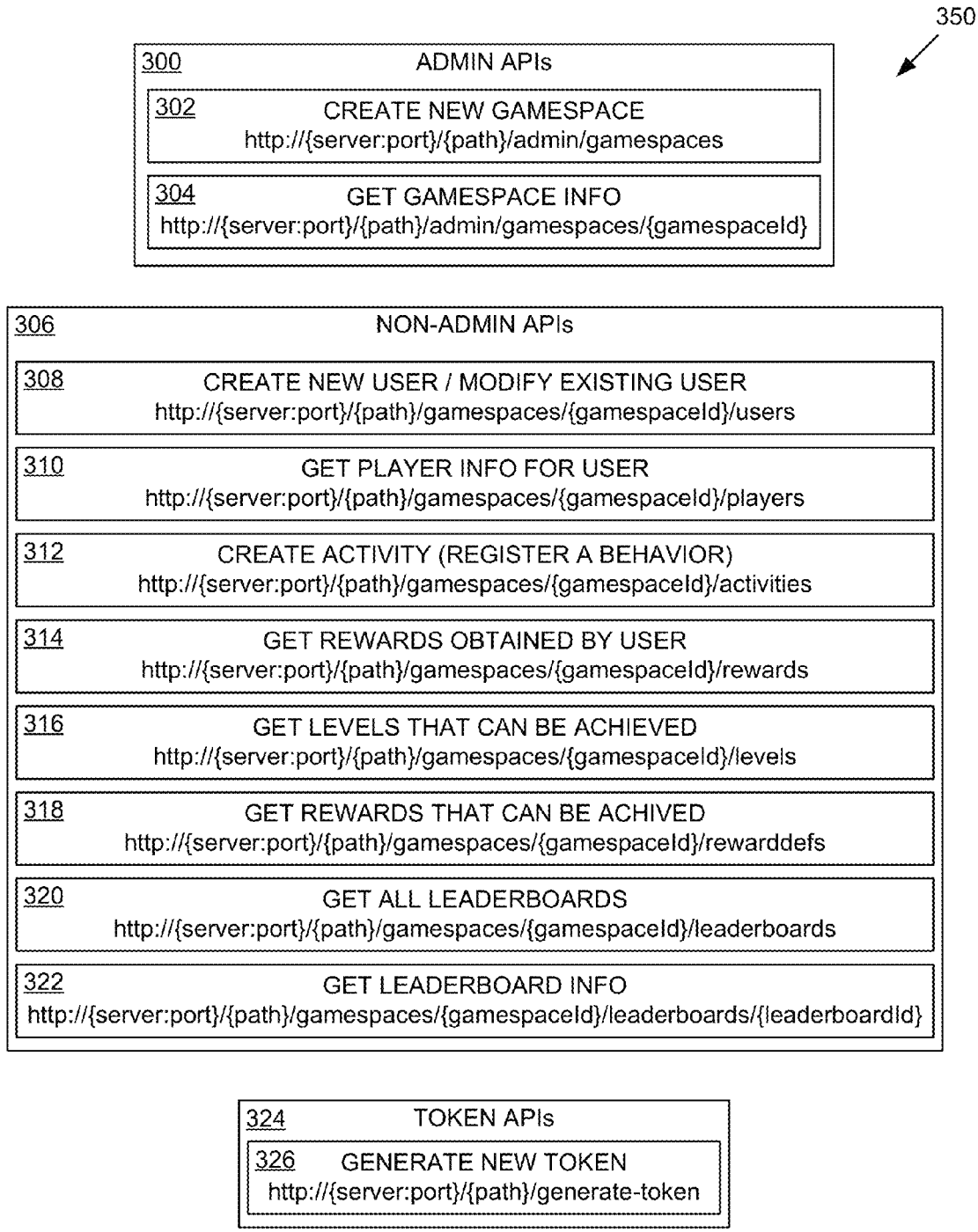
FIG. 3 illustrates a common gamification API in accordance with one embodiment.

FIG. 3 illustrates a common gamification API in accordance with one embodiment. In such an embodiment, gamified applications can communicate with gamification provider abstraction layer 18 using common gamification API 350 that can include admin APIs 300, non-admin APIs 306, and token APIs 324. Admin APIs 300 can include a create new gamespace API 302 and a get gamespace information API 304. Non-admin APIs 306 can include a create new user API 308, a get player info API 310, a create activity API 312, a get rewards API 314, a get levels API 316, a get achievable rewards API 318, a get all leaderboards API 320, and a get leadership info API 322. Token APIs 324 can include a generate new token API 326.

In some embodiments, APIs 300-326 can be implemented as Representational State Transfer ("REST") APIs made available over the Hypertext Transfer Protocol ("HTTP") at the indicated Uniform Resource Identifier ("URI") using HTTP POST and GET method requests that include data formatted according to the JavaScript Object Notation ("JSON") format, as described below.

In some embodiments, authentication can be provided using client credentials (e.g., username and password) and/or token-based authentication. For example, admin APIs 300 can be accessed by supplying client credentials, such as a username and password, according to the HTTP basic access authentication method. Non-admin APIs 306 can be accessed using token-based authentication using, for example, tokens generated via generate new token API 326.

Create new gamespace API 302 can be invoked to create a new gamespace. Requests to 302 can be supplied via HTTP POST with the following data:
 gamespaceName (Optional gamespace name. If not provided, the gamespace name can be generated);
 accessType (Optional, valid values: private, inherited, public. If not provided, it will be set to 'inherited' when parent gamespace parameter is specified, otherwise to 'private');
 gamespaceTemplate (Optional, Template name for creating a gamespace);
 parentGamespace (Optional, Parent gamespace name under which the new gamespace should be created);
 gamespaceDescription (Optional, brief description about the gamespace).

Responses to create new gamespace API 302 requests can include the following data:
 gamespaceId;
 gamespaceName;
 key (Secret key used to create gamespace access tokens. This value can be set for private gamespaces. In order to access public gamespaces, users can use their client key. The client key can be assigned to each client upon provisioning. There is only one client key per client. Client key differs from a gamespace key in that a gamespace key is used to access a single private gamespace (or its sub-hierarchy), and a client key is used to access all public gamespaces.)

The following is an example request/response under create new gamespace API 302 to create a new gamespace:
Example 302 request to create a new gamespace:

```
POST /path/admin/gamespaces HTTP 1.1
Host: http://server:7001
Authorization: Basic dGVzdDAwMDE6dGVzdDAwMDE=
Accept: application/json
Content-Type: application/json;charset=UTF-8
Content-Length: ...
{
    "name":"XYZ-Gamespace",
    "accessType":"private",
    "template":"TEST-Gamespace-Template",
    "parentGamespace":"",
    "description":"Test gamespace"
}
```

Example 302 response:

```
200 OK
Location: http://server:7001/path/admin/gamespaces
Content-Type: application/json;charset=UTF-8
Content-Length: ...
{
    "id":"123",
    "name":"XYZ-gamespace",
    "Key":"267e5d049fd74a1721a5fef89a320388c3a82fee678691de86
2ed34196d1a42fe274bb85ea2774c844bd8906e6b6def52f18ea6322f8ba3
e3a90b4c50c8391dhdddddhcp"
}
```

Get namespace information API 304 can be invoked to get information describing an existing gamespace. Requests to 304 can be supplied via HTTP GET with the following data:
 gamespaceId.

Responses to 304 requests can include the following data:
 gamespaceId;
 gamespaceName;
 key;
 accessType;

gamespaceTemplate;
parentGamespace;
gamespaceDescription.

The following is an example request/response under 304 to get information about a gamespace:

Example 304 request to get information about gamespace with gamespaceId of 123:

```
GET /path/gamespaces/123 HTTP 1.1
Host: http://server:7001
Authorization: Basic dGVzdDAwMDE6dGVzdDAwMDE=
Accept: application/json
Content-Type: application/json;charset=UTF-8
Content-Length: ...
{
    "gamespaceId":"123"
}
```

Example API 304 response including information regarding the gamespace with the gamespaceId of 123:

```
Response
200 OK
Location: http://server:7001/path/admin/gamespaces/123
Content-Type: application/json;charset=UTF-8
Content-Length: ...
{
    "id":"123",
    "name":"XYZ-gamespace",
    "Key":"267e5d049fd74a1721a5fef89a320388c3a82fee678691de86
2ed34196d1a42fe274bb85ea2774c844bd8906e6b6def52f18ea6322f8ba3
e3a90b4c50c839191"
    "accessType":"private"
    "template":"TEST-Gamespace-Template",
    "parentGamespace":"Oracle-Network",
    "description":"Test gamespace"
}
```

Create new user API 308 can be invoked to create or modify a user. Requests to 308 can be supplied via HTTP POST with the following data:

user;

gamespace;

gamespaceId (Provided in the path of the URI).

Responses to create new user API 308 requests can include an HTTP response code to indicate whether the 308 request was successful.

The following is an example request/response under create new user API 308 to get information about a gamespace:

Example 308 request to create a new user:

```
POST /path/gamespaces/123/users HTTP 1.1
Host: http://server:7001
CBS-user: FooUserName
CBS-token:
31ef6e613cee916d95e29f6bd0f09a368e13a681601b1d3670ef1608d1545077
bfc96cb0a6b4aee5894a5c30a40b02f07fef506180b76e938daa322cf5147d24
5dd93f789536a1e6
    Accept: application/json
    Content-Type: application/json;charset=UTF-8
    Content-Length: ...
    {
        "user":"FooUserName",
        "gamespace":"XYZ-gamespace"
    }
}
```

Example 308 response:

```
204 No Content
Location: http://server:7001/path/gamespaces/123/users
Content-Length: ...
```

The HTTP status code 204 in the example 308 response shown above can indicate that the 308 request was successful and the requested user was added successfully. Other HTTP status codes can be used to indicate failure of the 308 request due to an error. For example, HTTP status code 400 can be used to indicate an invalid request, 401 can indicate an unauthorized request, 403 can indicate an internal server error, or 406 can indicate that the headers sent in the request are not acceptable. In some embodiments, HTTP status codes can also be used for responses in one or more of other APIs 300-226.

Get player info API 310 can be invoked to get player information. Requests to 310 can be supplied via HTTP GET with a user identifier included in the HTTP request header.

Responses to get player information API 310 requests can include the following data:

allPoints;
dayPoints;
weekPoints;
monthPoints;
level;
nextLevel;
name;
description;
gamespace;
achievedDate;
imageId;
imageUrl;
startPoints;
position.

The following is an example request/response under API 310 to get information about a gamespace:

Example API 310 request to get the player information for user "XYZuser":

```
GET /path/gamespaces/123/players HTTP 1.1
Host: http://server:7001
CBS-user: XYZuser
CBS-token:
31ef6e613cee916d95e29f6bd0f09a368e13a681601b1d3670ef1608d1545077
bfc96cb0a6b4aee5894a5c30a40b02f07fef506180b76e938daa322cf5147d24
5dd93f789536a1e6
Accept: application/json
```

Example get player information API 310 response:

```
200 Ok
Location: http://server:7001/path/gamespaces/123/players
Content-Type: application/json;charset=UTF-8
Content-Length: ...
{
    "allPoints":200,
    "dayPoints":5,
    "weekPoints":35
    "monthPoints":115,
    "level":{
        "name":"Level3",
        "description":"",
        "gamespace":"XYZ-gamespace",
        "achievedDate":"value",
        "imageId":null,
        "imageUrl":null,
        "startPoints":300,
        "position":3
    },
    "nextLevel":{
        "name":"Level4",
        "description":"",
        "gamespace":"XYZ-gamespace",
        "achievedDate":"value",
        "imageId":null,
        "imageUrl":null,
        "startPoints":1500,
        "position":4
    }
}
```

In some embodiments, non-admin APIs 308 and 310 utilize token-based authentication by populating custom HTTP header fields "CBS-user" and "CBS-token" with the target user and token value, respectively, as shown above. Although not shown, the remaining non-admin APIs, 312-322, can also utilize similar token-based authentication. Tokens can be generated using generate new token API 326, as described below, and further described in FIG. 7.

Create activity API 312 can be invoked to create an activity for a user (for example, register a behavior). Requests to 312 can be supplied via HTTP POST with the following data:

activity (Activity as it known by the gamification provider);

customProp (Optional custom property for this activity where [customProp] is to be substituted by the actual property name. Zero to many properties could be specified).

Responses to 312 requests can include an HTTP response code to indicate whether the 312 request was successful.

Get rewards obtained by user API 314 can be invoked to get a list of rewards earned by a given user. Requests to 314 can be supplied via HTTP GET with the given user being supplied in the custom HTTP header field "CBS-user".

Responses to 314 requests can include the following data:

page;

data (Array of reward objects. Each reward object includes the following properties: name, description, achievedDate, gamespace, imageId, imageUrl);

name (Reward Name);

description (Reward Description);

achievedDate (Date the reward was given);

gamespace (Gamespace the reward is associated with, if applicable);

imageId (Reward image id);

imageUrl (Reward image URL);

rewardCounter (Number of times the reward is achieved).

Get levels API 316 can be invoked to get a list of all levels that can be achieved in a given gamespace. Requests to API 304 can be supplied via HTTP GET with the gamespace identifier being included in the URI path.

Responses to 316 requests can include the following data:

page;

data (Array of level objects. Each level object includes the following properties: name, description, gamespace, startPoints);

name (Level Name);

description (Level Description);

gamespace (Gamespace the level is associated with, if applicable); and startPoints (Number of points required to reach the level)

Get all rewards API 318 can be invoked to get a list of all rewards that a user can achieve. Requests to 318 can be supplied via HTTP GET with the CBS-user custom HTTP header field indicating the user for which the list of achievable rewards is requested.

Responses to 318 requests can include the following data:

page;

data (Array of reward objects. Each reward object includes the following properties: name, description, achievedDate, gamespace, imageId, imageUrl);

name (Reward Name);

description (Reward Description);

achievedDate (Date the reward was given);

gamespace (Gamespace the reward is associated with, if applicable);

imageId (Reward image id);
imageUrl (Reward image URL);
position (Position of this reward).

Get all leaderboards API 320 can be invoked to get all the leaderboards for a given gamespace. Requests to 320 can be supplied via HTTP GET with the target gamespace being identified in the URI path.

Responses to 320 requests can include the following data:
leaderboardName;
description;
gamespace;
positions (Array of player position objects, where each position object has positionNumber and playerId property described below);
positionNumber (Player position in the leaderboard);
playerId (Player Id from the gamification provider, such as Badgeville);
badgevilleLeaderboardId (Leaderboard Id);
leaderboardField (Field to filter leaderboard);
leaderboardCommand (Command to use when ranking players);
leaderboardLabel (Default points label);
selector (Object that contains verb and createdAt);
verb ( );
created_at;
page (Current page Number).

Get leaderboard information API 322 can be invoked to get leaderboard information for a particular leaderboard. Requests to 322 can be supplied via HTTP GET with the leaderboard indicator being included in the URI path.

Responses to 322 requests can include data for one leaderboard similar to the data returned in response to 320 requests.

Generate token API 326 can be invoked to generate a token that can be used to access non-admin APIs 308-322. Requests to 326 can be supplied via HTTP POST with the following data:
gamespaceId (Game space ID for which you need to perform an action, e.g., the gamespace in which you wish to invoke a non-admin API);
timestamp (Number (8 bytes, milliseconds since 1970));
signature (Gamespace key; for example, the key returned in response to a create new gamespace API 302 request);
nonce (Unique Random Number, nonce for every token generation request should be unique);
user (user for which the token is generated).

Responses to 326 requests can include the following data: token.

The following is an example request/response under API 326 to generate a new token:

Example 326 request:

```
POST /path/token HTTP 1.1
Host: http://servcer:7001
Accept: application/json
Content-Type: application/json;charset=UTF-8
Content-Length : ...
{
    "gamespaceId":1005,
    "timestamp":1366148663042,
    "signature":"31ef6e616b1446fd7010e0fdc60a8f7ccd247a7e2985b2
b9e7acb8120c3d18f5c02dbd30d3964687b7b890f0b195e6a29ed8721f92a
37503fceaa8b7ebc67a39fc4c69125a013578",
        "nonce":"68a86d4ec4300000013e14ce470200000001",
        "user":"cleartest"
}
```

Example generate token API 326 response:

```
200 Ok
Location: http://server:7001/path/token
Content-Type: application/json;charset=UTF-8
Content-Length: ...
{
    "token":"31ef6e616b144a84003cfa0a3fb143a8e626a614b384ac19
41ac852bba5038600e362d359bbb046bf8f69ae9767eb37287d169002081
7331316a7a6d9d2b1ba5dbaccc98bf7c3c7e"
}
```

The token returned by 326 can then be used by clients to access the non-admin APIs 308-322, which can utilize token based authentication.

FIG. 4 illustrates an example mapping between common gamification API 350 of FIG. 3 and the gamification provider Badgeville in accordance with one embodiment.

In embodiments, when Badgeville is selected as the gamification provider, top level gamespaces (directly under the root gamespace) can be mapped to Badgeville's network. Other gamespaces below the top level gamespaces can be mapped to Badgeville sites, and the sites can be created from templates. Top level registered users can be mapped to Badgeville users and individual activity properties can be mapped to similar behavior properties as is, without any property name/value translations.

Figure 5A:
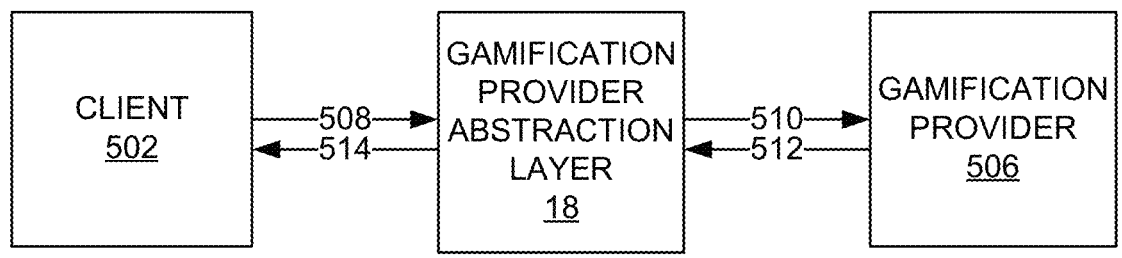
FIG. 5A is a block diagram illustrating data flow across the gamification provider abstraction layer of FIG. 1 in accordance with one embodiment.

FIG. 5A is a block diagram illustrating data flow across gamification provider abstraction layer 18 of FIG. 1 in accordance with one embodiment. Gamification provider abstraction layer 18 can transmit data to and receive data from client 502 in accordance with a common gamification API, such as common gamification API 350 shown in FIG. 3 above. Gamification provider abstraction layer 18 can transmit data to and receive data from gamification provider 506 to fulfill client 502 requests.

Gamification provider abstraction layer 18 can be configured to receive from Client 502 a common request 508 (e.g., one of the admin APIs 300 such as create gamespace API 302 request). Gamification provider abstraction layer 18 can be configured to create and transmit a provider-specific request 510 based on common request 508 to gamification provider 506. For example, if the selected gamification provider is Badgeville, gamification provider abstraction layer 18 can create a Badgeville-specific request to create a Badgeville network or site and transmit it to Badgeville.

Gamification provider abstraction layer 18 can be configured to receive a provider-specific response 512 from gamification provider 506. Gamification provider abstraction layer 18 can create a common response 514 based on the received provider-specific response 512, and transmit common response 514 to client 502.

It will be appreciated that the actual gamification provider 506 can be swapped without impacting client 502. For example, Bunchball can replace Badgeville as the selected gamification provider 506 without requiring changes to client 502 because client 502 and gamification provider abstraction layer 18 can be configured such that client 502 does not directly interact with the selected gamification provider 506.

Figure 5B:
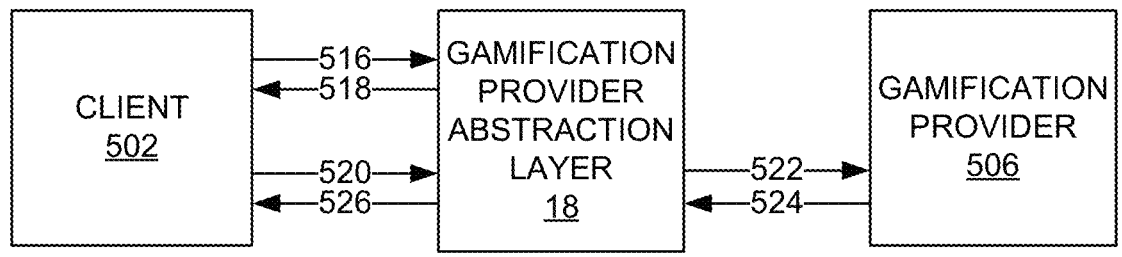
FIG. 5B is a block diagram illustrating data flow across the gamification provider abstraction layer of FIG. 1 utilizing token-based authentication in accordance with one embodiment.

FIG. 5B is a block diagram illustrating data flow across gamification provider abstraction layer 18 of FIG. 1 utilizing token-based authentication in accordance with one embodiment.

Gamification provider abstraction layer 18 can transmit data to and receive data from client 502 in accordance with a common gamification API, such as common gamification API 350 shown in FIG. 3. Gamification provider abstraction layer 18 can transmit data to and receive data from gamification provider 506 to fulfill client 502 requests.

Gamification provider abstraction layer 18 can be configured to receive a generate token request 516, such as generate token API 326 request as shown in FIG. 3 above. Gamification provider abstraction layer 18 can be configured to generate a token and transmit a generate token response 518 including the generated token to client 502.

Gamification provider abstraction layer 18 can be configured to receive a common request from client 502 and apply token-based authentication, such as the token based authentication described above for non-admin API 306 requests shown in FIG. 3. For example, client 502 can transmit a common request 520 (e.g. any non-admin API 306 request) that includes the token received at 518 for token-based authentication. Gamification provider abstraction layer 18 can receive common request 520, authenticate the token, create a provider specific request 522 based on the common request, and transmit provider specific request 522 to gamification provider 506.

In some embodiments, gamification provider abstraction layer 18 can be configured to transform data prior to transmitting provider-specific request 510 and/or 522 to gamification provider 506. For example, gamification provider abstraction layer 18 can be configured to de-identify any identification data that may be a part of provider-specific request 510/522 and/or modifying medical-related data, as described in FIGS. 6 and 8 below. In another example, gamification provider abstraction layer 18 can be configured to de-identify data sent to selected gamification provider 506 for those users who have not opted-in to the service, as described in FIGS. 6 and 8 below.

Figure 6:
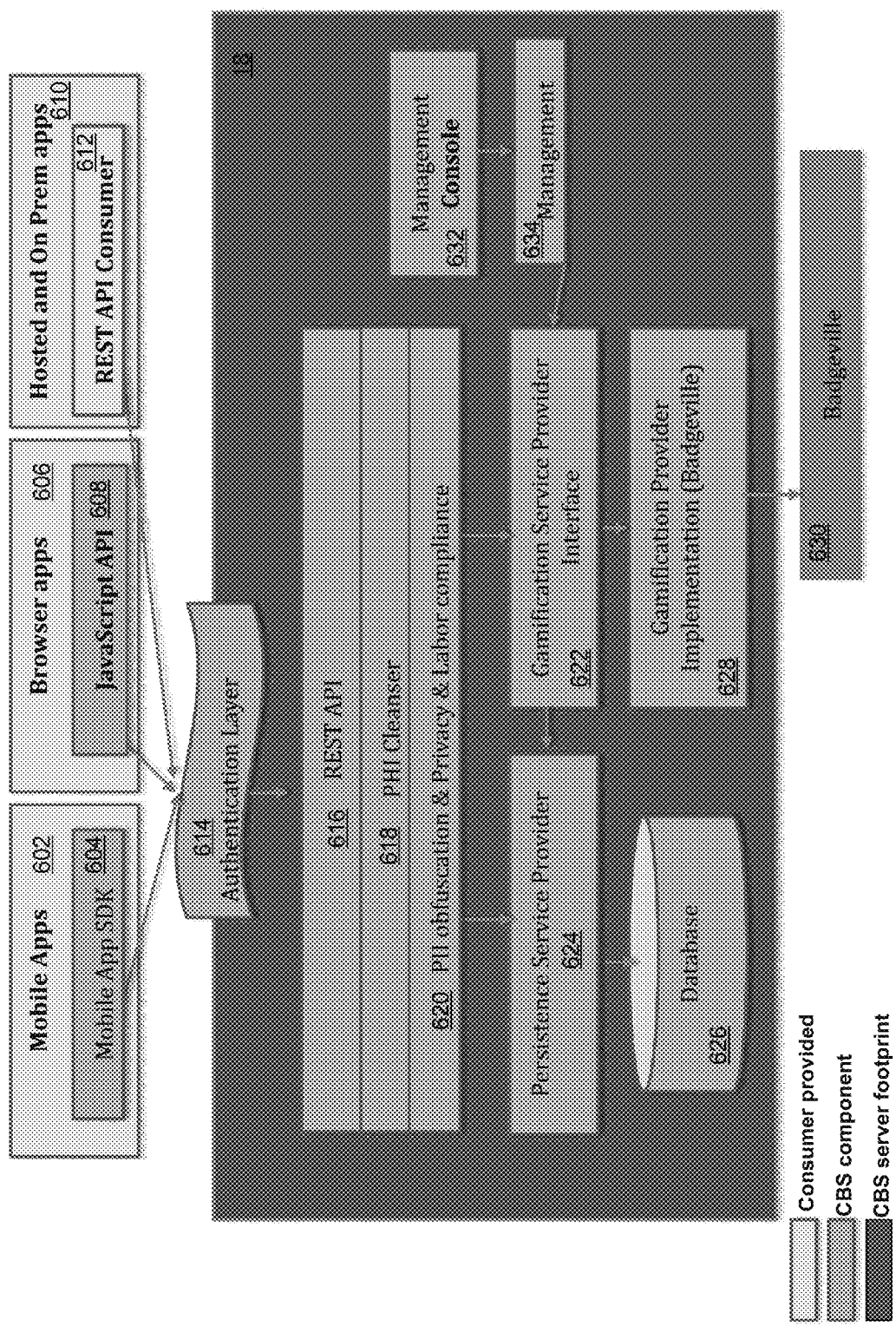
FIG. 6 is a block diagram of a system including the gamification provider abstraction layer of FIG. 1 in accordance with one embodiment.

FIG. 6 is a block diagram of a system including gamification provider abstraction layer 18 of FIG. 1 in accordance with one embodiment. System 600 includes mobile application 602, browser application 606, hosted/on-premises application 610, gamification provider abstraction layer 18, database 626, and gamification provider 630.

Gamified applications 602, 606, and 610 include modules 604, 606, and 612, respectively, to facilitate communications with gamification provider abstraction layer 18. Gamification provider abstraction layer 18 can include an authentication layer 614, a REST API module 616 implementing common gamification API 350, as shown in FIG. 3 above, a Personal Health Information ("PHI") cleaner module 618, a Personally Identifiable Information ("PII") obfuscation and privacy/labor compliance module 620, a gamification service provider interface module 622, a persistence service provider module 624, and a gamification provider implementation module 628.

In some embodiments, mobile application SDK 604 and JavaScript API 608 can be configured to provide a client SDK and API to mobile application 602 and browser application 606, respectively, for connecting to gamification provider abstraction layer 18 via REST API module 616 which implements common gamification API 350. For example, JavaScript module 608 can include JavaScript client APIs that are AJAX-based and invoke the respective server APIs of common gamification API 350, accordingly.

In operation, requests from gamified applications 602, 606, and 610 can be authenticated by authentication module 614 using HTTP basic authorization and/or a custom token authentication schema, as provided by common gamification API 350. The authenticated requests can be handled to REST API module 616 which can delegate further processing to PHI cleaner module 618, PII obfuscation and privacy/labor compliance module 620, gamification provider interface module 622, and/or gamification provider implementation module 628 to create a provider specific request.

PHI cleaner module 618 can ensure that behaviors and data pass screening before being sent to gamification provider 630. For example, in some embodiments PHI cleaner module 618 can provide for the de-identification of personal health information before it is sent to gamification provider 630. In embodiments, de-identification can be performed by convention and/or registration.

For example, de-identification performed by convention can be defined by an Augmented Backus-Naur Form ("ABNF"). In one embodiment, de-identification by convention can be defined by the following ABNF:

```
Kvps := 1*typedKvp ; typedKvp occurs at least once
typedKvp := activityKvp/intKvp/strKvp/hexKvp;
activityKvp := activityKey colon activityValue ;
activityKey := "activity";
activityValue := intValue ;
intValue := 1*DIGIT;
colon := ":";
intKvp := intKey colon intValue ;
intKey := "int" underscore keySuffix;
strKvp := strKey colon strValue ;
strKey := "str" underscore keySuffix;
strValue := 1* (ALPHA/DIGIT) ;
hexKvp := hexKey colon hexValue;
hexKey := "hex" underscore keySuffix;
hexValue : = 1*HEXDIG ;
b64Kvp := b64 colon b64Value;
b64Key := "b64" underscore keySuffix;
b64Value := SPECIAL_BASE64 ; A Base64 encoded String type is
supported
underscore := "_";
keySuffix := keyType underscore intValue;
keyType := metaKeyType / eventKeyType;
metaKeyType := "meta";
eventKeyType := "event";
```

In another example, de-identification performed by registration can be performed by configuration. In such an example, PHI cleaner module 618 can load a JSON document to be used to perform de-identification.

For example, the JSON document can contain a list of valid gamification activity property names for a given gamespace. The valid property names can be obfuscated property names. Subsequently, PHI cleaner module 618 can validate the properties of gamification activities posted by clients against the list of valid gamification activity property names contained in the JSON document. If at least one activity property is not found in the pre-defined list contained in the JSON document (e.g., the client attempts to use an unobfuscated property not contained in the JSON document), the posted activity is rejected by the gamification abstraction layer and not submitted to a gamification provider. In such examples, the gamification abstraction layer does not maintain a mapping of the obfuscated property names to their respective unobfuscated counterparts, and therefore even if both the gamification abstraction layer and the gamification provider are compromised, the attacker will not be able to de-identify the data. In such examples, the de-identification mapping is maintained solely on the client side.

PII obfuscation and privacy/labor compliance module 620 can ensure legal and regulatory compliance by verifying a player's eligibility for behavior collection and to obfuscate usernames before sending them to gamification provider 630. Some countries do not allow behavior collection for certain employees or other classes of users, while some countries allow behavior collection of users who expressly opt-in to the collection. PII obfuscation and privacy/labor module 620 can be aware of the applicable rules and ensure compliance with privacy and labor laws. For example, an opt-in field can be associated with each user and set if the user has expressly opted-in to behavior collection. In another example, PII obfuscation and privacy/labor compliance module 620 can be aware of the privacy and labor rules applicable to a user (based on, e.g., the user's Internet Protocol ("IP") address, mailing address, work address, company place of business, server location, etc.) and ensure that behavior collection is not performed if not permitted under the applicable country's privacy and/or labor rules.

Gamification provider interface module 622 can provide one or more service provider implementations, such as gamification provider implementation 628, for integrating with one or more specific gamification provider 630, such as Badgeville. The service provider implementations delegate the provider-specific requests to the actual external gamification provider 630, e.g. Badgeville.

In some embodiments, modules 614-622 and 628 can use persistent storage and interface with database 626 using persistence service provider 624.

Figure 7:
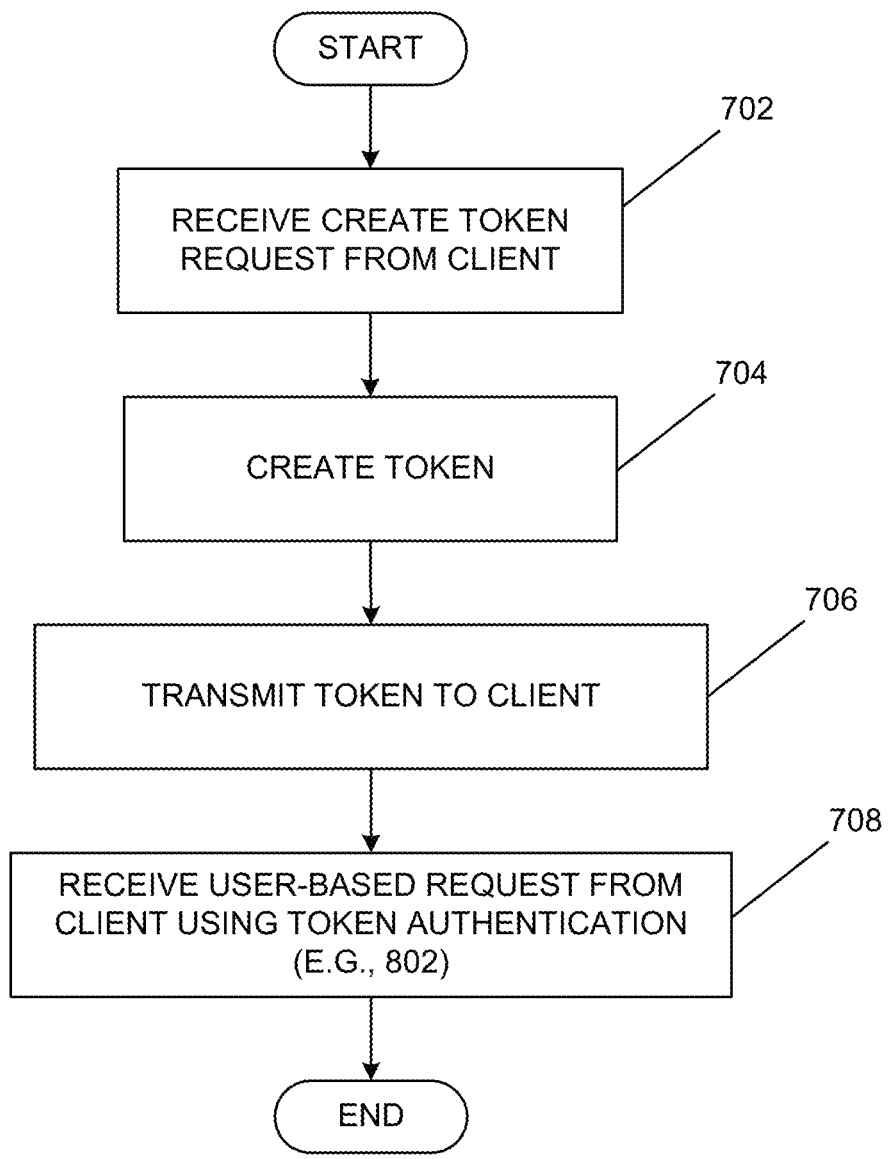
FIG. 7 is a flow diagram showing the functionality for generating user access tokens in accordance with one embodiment.

FIG. 7 is a flow diagram showing the functionality for generating user access tokens in accordance with one embodiment. In one embodiment, the functionality of the flow diagram of FIG. 7, and FIGS. 8 and 10 below, are implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 702, module 18 receives a create token request from a client. In some embodiments, the create token request can be a generate new token API 326 request, as shown in FIG. 3 above. For example, in embodiments, the create token request includes at least a key (signature) and a nonce value.

At 704, module 18 creates a new token based on the create token request including at least the key and nonce value.

At 706, module 18 transmits a response to the client including the newly created token.

At 708, module 18 receives a request, such as a non-admin API 306 request including the token generated at 704 and authenticates the user. Under the token-based authentication scheme, each token can be used only one time.

Figure 8:
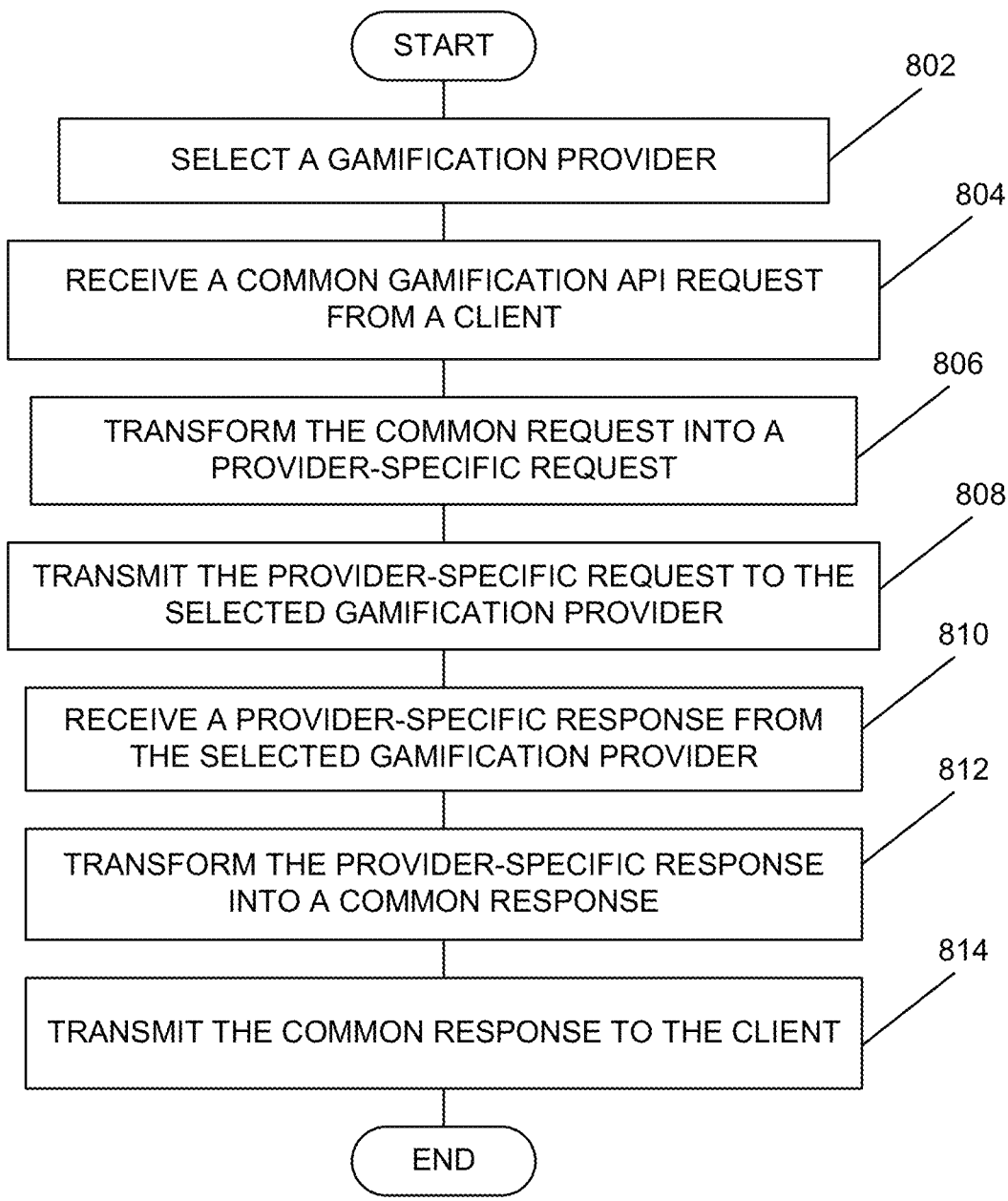
FIG. 8 is a flow diagram of functionality for processing a request of the common gamification API of FIG. 3 in accordance with one embodiment.

FIG. 8 is a flow diagram of functionality for processing a request of common gamification API 350 of FIG. 3 in accordance with one embodiment. Embodiments can receive common requests from clients, create provider-specific requests based on the common request, de-identify personal health information, obfuscate or remove sensitive data such as personally identifying information, and ensure compliance with privacy/labor rules before sending provider-specific requests to a selected gamification provider.

At 802, module 18 selects a gamification provider, such as Badgeville, Bunchball, etc. In some embodiments, the gamification provider is selected once and only one gamification provider can be selected at a time for all clients. In other embodiments, the gamification provider can be selected on a per client, per user/player, or per gamespace basis.

At 804, module 18 receives a common gamification API request from a client, such as a create activity 312 request. In some embodiments, the common request is authenticated using token-based authentication.

At 806, module 18 transforms the common request into a provider specific request. In some embodiments, transforming the common request into a provider specific request includes de-identify personal health information, obfuscate sensitive data such as personally identifying information, and/or ensure compliance with privacy/labor rules before sending provider-specific requests to a selected gamification provider, as described above in FIG. 6.

At 808, module 18 transmits the provider-specific request to the selected gamification provider.

At 810, module 18 receives a provider-specific response from the selected gamification provider.

At 812, module 18 transforms the provider-specific response into a common response in accordance with the common API.

At 814, module 18 transmits the common response to the client.

In some embodiments, module 18 can receive requests in accordance with common gamification API 350, as shown in FIG. 3 above.

Figure 9:
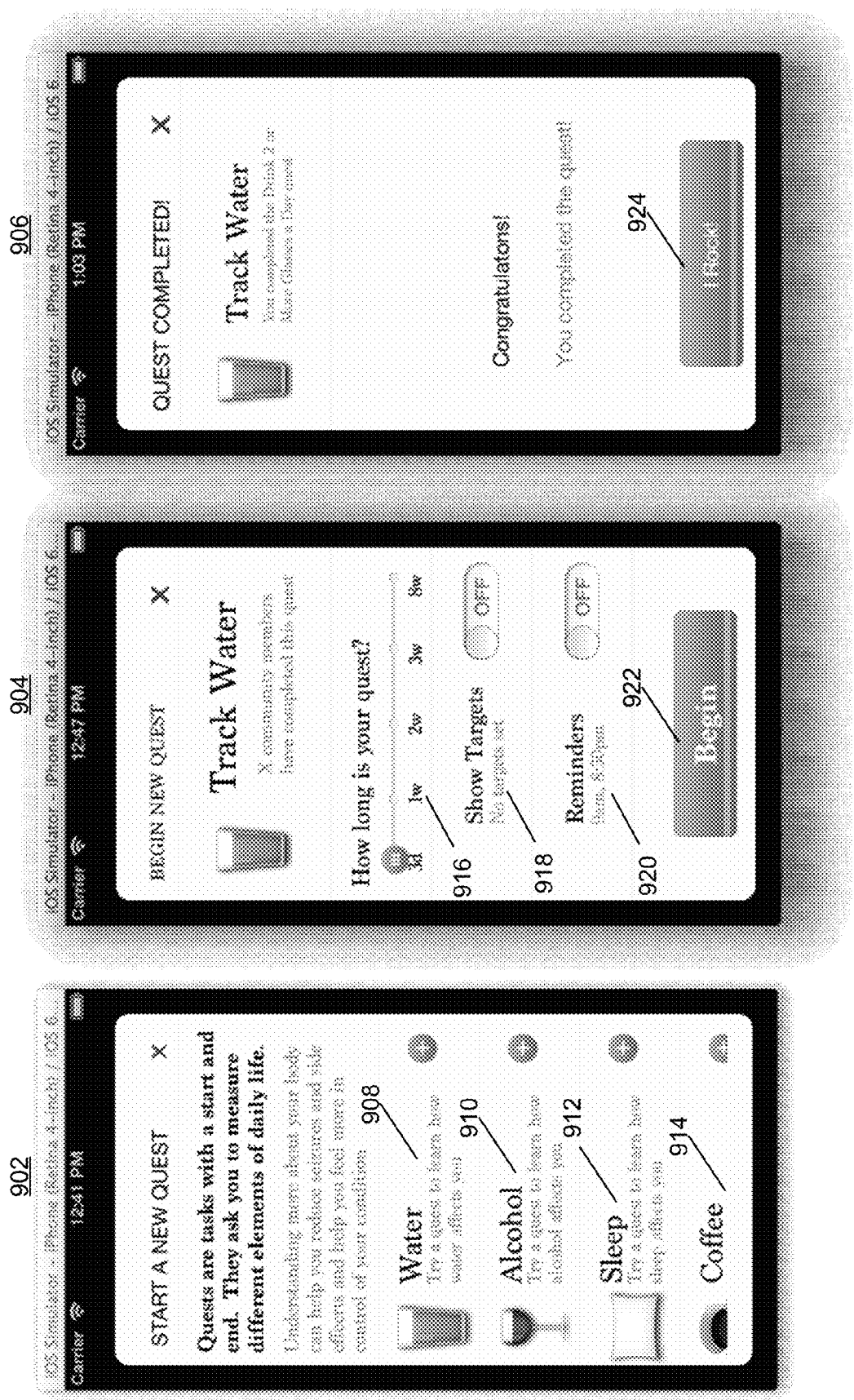
FIG. 9 illustrates an example mobile application with gamification services enabled in accordance with one embodiment.

FIG. 9 illustrates an example gamified mobile application in accordance with one embodiment. The mobile application can be gamified to encourage users to adhere to certain medically suggested activities. The gamified mobile application can include a start quest screen 902, a begin quest screen 904, and a complete quest screen 906.

Start quest screen 902 can include a list of available quests such as a water quest 908, an alcohol quest 910, a sleep quest 912, and/or a coffee quest 914.

If a user selects to begin a water quest, begin quest screen 904 can be displayed and the user can select one or more desired water quest parameters to be applied such as length of quest 916, show targets 918, and enable reminders 920. The user can begin the water quest using the desired parameters by selecting begin 922.

In some embodiments, when the user begins a water quest, the user's behavior can be recorded using the common gamification API provided by the gamification provider abstraction layer 18 of FIG. 1 to track the user's progress (i.e., adherence to the quest parameters) and provide progress rewards. For example, in some embodiments, the gamified mobile application illustrated in FIG. 9 interfaces with the common gamification API which interacts with a gamification provider (e.g., Badgeville) so that the gamified mobile application does not interact directly with the gamification provider. Examples of the gamified mobile application include applications utilizing the Medical Adherence Tracker Framework disclosed in U.S. patent application Ser. No. 14/085,987, filed on Nov. 21, 2013, the contents of which is hereby incorporated by reference in its entirety.

Complete quest screen 906 can be shown when the user completes a water quest. The user can view rewards earned for completing the quest by selecting button 924. Rewards can be based on user behavior recorded by the application as discussed hereinabove.

Figure 10:
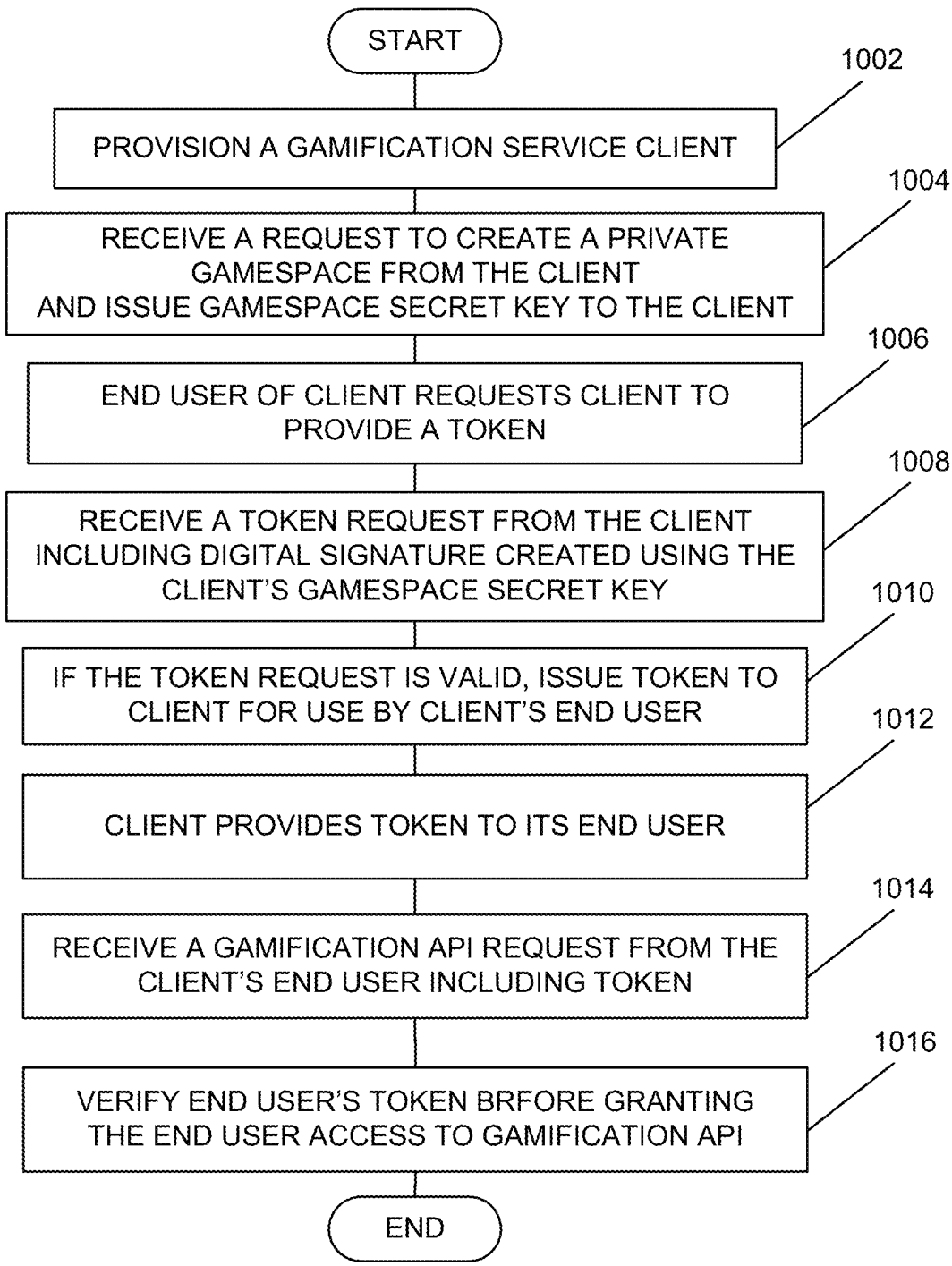
FIG. 10 is a flow diagram showing the functionality for authenticating users of gamification provider abstraction layer of FIG. 1 in accordance with one embodiment.

FIG. 10 is a flow diagram showing the functionality for authenticating users of gamification provider abstraction layer 18 of FIG. 1 in accordance with one embodiment. In some embodiments, gamification provider abstraction layer 18 can implement a standard authorization method that permits custom authentication grants, such as, for example, the OAuth 2.0 authorization standard which includes a custom grant feature described in section 4.5 of the OAuth 2.0 specification.

For example, custom authentication grants, such as those found in section 4.5 of the OAuth 2.0 specification, can allow a client of gamification provider abstraction layer 18 to provide its (the client's) users with access to gamification provider abstraction layer 18 which can be owned and managed by a second entity separate from the client. The functionality shown in FIG. 10 avoids the need to provision each end user of the client within gamification provider abstraction layer 18.

At 1002, module 18 provisions a gamification service client. As part of the provisioning process, the client is issued client credentials. The credentials are used to access module 18 at 1004 below. In some embodiments, this is a one-time activity per client.

At 1004, the client transmits a request to module 18 to create a private gamespace. As part of the gamespace creation, module 18 issues the client a gamespace secret key. Both the client and module 18 store the key securely. In some embodiments, this is a one-time activity per gamespace.

At 1006, an end user requests the client to provide a token to access module 18. The client can define its own protocol and/or requirements for the end user request, because the end user's request is not required to be received nor is it required to be processed by module 18.

At 1008, the client sends a token request to module 18 on behalf of the user. In some embodiments, token request includes gamespace identifier, user identifier, timestamp, certain unique identifier ("nonce") and a digital signature of these parameters. Digital signature is created using the gamespace key from 1004 above, and can be based, for example, on a keyed-hash message authentication code ("HMAC") algorithm such as an HMAC-512 algorithm (e.g., HMAC-MD5 or HMAC-SHA1).

At 1010, if the request is valid (e.g., digital signature verified successfully), module 18 issues a token to the client. In some embodiments, the token itself includes a timestamp and the digital signature of the timestamp, user id and gamespace id. This digital signature is based on the same gamespace key, and can be based on, for example, an HMAC-512 algorithm.

At 1012, the client provides a token back to the end user.

At 1014, the end user uses the token to access module 18 APIs directly, such as, for example, common gamification API 350 of FIG. 3.

At 1016, module 18 verifies the end user's token before providing the end user access to module 18 APIs.

As disclosed, embodiments comprise a gamification provider abstraction layer to provide a common interface for client applications to engage in behavior collection in configurable gamespaces without directly interacting with a specific gamification provider. The abstraction layer can provide de-identification of health information for HIPAA compliancy, personal information obscuration, privacy/labor compliance assurance, and enhanced token-based authentication.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to manage a gamification provider abstraction layer, the managing comprising:
   selecting a gamification provider, the gamification provider being configured to perform gamification actions that track user behavior and convert the user behavior into a game, the game including generating a reward for a user when the user accomplishes a desired task;
   creating a plurality of gamespaces in a hierarchy, each gamespace being a unique namespace where the gamification actions are performed in isolation from hierarchically unrelated gamespaces;

receiving a common gamification request message from a client, the common gamification request message having a format common to any selected gamification provider;

creating a provider-specific request message based on the received common gamification request message and the selected gamification provider, the provider-specific request message having a provider-specific format based on the selected gamification provider; and transmitting, via a network, the provider-specific request message to the selected gamification provider, wherein when the common gamification request message includes personal identification data, the creating the provider-specific request message comprises transforming the personal identification data into de-identified data, wherein the common gamification request message includes a gamespace indicator, and the common gamification request message applies only to qamespaces hierarchically related to the indicated gamespace, and wherein a first gamespace is hierarchically related to a second gamespace if the first gamespace is a child of the second gamespace in the hierarchy.

2. The computer readable medium of claim 1, the managing further comprising:

receiving a provider-specific response from the gamification provider;

creating a common gamification response message based on the received provider-specific response; and transmitting the common gamification response message to the client.

3. The computer readable medium of claim 1, wherein transforming the personal identification data into de-identified data comprises encoding the personal identification data.

4. The computer readable medium of claim 1, wherein transforming the personal identification data into de-identified data comprises encrypting the personal identification data.

5. The computer readable medium of claim 1, wherein at least one of the gamespaces is shared among a plurality of applications.

6. The computer readable medium of claim 5, the managing further comprising:

presenting a consistent behavior user interface across all applications sharing the same gamespace.

7. The computer readable medium of claim 1, wherein the creating a plurality of gamespaces comprises receiving a create gamespace request message and authenticating the create gamespace request message using a first authentication model; and wherein the receiving a common gamification request message comprises authenticating the common gamification request message using a second authentication model.

8. The non-transitory computer readable medium of claim 1, wherein the reward is generated when the user accomplishes the desired task in a non-gaming context, the non-gaming context being activities which differ from conventional game-related activities.

9. A system comprising:

a memory device configured to store a gamification provider abstraction layer module;

a processing device in communication with the memory device, the processing device configured to execute the gamification provider abstraction layer module stored in the memory device;

wherein the gamification provider abstraction layer module comprises a common gamification application programming interface configured to:

select a gamification provider, the gamification provider being configured to perform gamification actions that track user behavior and convert the user behavior into a game, the game including generating a reward for a user when the user accomplishes a desired task;

creating a plurality of gamespaces in a hierarchy, each gamespace being a unique namespace where the gamification actions are performed in isolation from hierarchically unrelated gamespaces;

receive a common gamification request message from a client, the common gamification request message having a format common to any selected gamification provider;

create a provider-specific request message based on the received common gamification request message and the selected gamification provider, the provider-specific request message having a provider-specific format based on the selected gamification provider;

transmit, via a network, the provider-specific request message to the selected gamification provider;

receive a provider-specific response from the gamification provider;

create a common gamification response message based on the received provider-specific response; and transmit the common gamification response message to the client, wherein when the common gamification request message includes personal identification data, the creating the provider-specific request message comprises transforming the personal identification data into de-identified data, wherein the common gamification request message includes a gamespace indicator, and the common gamification request message applies only to qamespaces hierarchically related to the indicated gamespace, and wherein a first gamespace is hierarchically related to a second gamespace if the first gamespace is a child of the second gamespace in the hierarchy.

10. The system of claim 9, wherein transforming the personal identification data into de-identified data comprises encoding the personal identification data.

11. The system of claim 9, wherein transforming the personal identification data into de-identified data comprises encrypting the personal identification data.

12. The system of claim 9, wherein at least one of the gamespaces is shared among a plurality of client applications.

13. The system of claim 12, wherein the creating a plurality of gamespaces comprises receiving a create gamespace request message and authenticating the create gamespace request message using a first authentication model, and wherein the receiving a common gamification request message comprises authenticating the common gamification request message using a second authentication model.

14. The system of claim 9, wherein the reward is generated when the user accomplishes a desired task in a non-gaming context, the non-gaming context being activities which differ from conventional game-related activities.

15. A computer implemented method comprising:

selecting a gamification provider, the gamification provider being configured to perform gamification actions that track user behavior and convert the user behavior into a game, the game including generating a reward for a user when the user accomplishes a desired task;

creating a plurality of gamespaces in a hierarchy, each gamespace being a unique namespace where the gamification actions are performed in isolation from hierarchically unrelated gamespaces;

receiving a common gamification request message from a client, the common gamification request message having a format common to any selected gamification provider;

creating a provider-specific request message based on the received common gamification request message and the selected gamification provider, the provider-specific request message having a provider-specific format based on the selected gamification provider;

transmitting, via a network, the provider-specific request message to the selected gamification provider;

receiving a provider-specific response from the gamification provider;

creating a common gamification response message based on the received provider-specific response; and transmitting the common gamification response message to the client, wherein when the common gamification request message includes personal identification data, the creating the provider-specific request message comprises transforming the personal identification data into de-identified data, wherein the common gamification request message includes a gamespace indicator, and the common gamification request message applies only to gamespaces hierarchically related to the indicated gamespace, and wherein a first gamespace is hierarchically related to a second gamespace if the first gamespace is a child of the second gamespace in the hierarchy.

16. The computer implemented method of claim 15, wherein at least one of the gamespaces is shared among a plurality of applications.

17. The computer implemented method of claim 16, wherein the creating a plurality of gamespaces comprises receiving a create gamespace request message and authenticating the create gamespace request message using a first authentication model, and wherein the receiving a common gamification request message comprises authenticating the common gamification request message using a second authentication model.

18. The computer implemented method of claim 15, wherein the reward is generated when the user accomplishes a desired task in a non-gaming context, the non-gaming context being activities which differ from conventional game-related activities.

19. The computer implemented method of claim 15, wherein transforming the personal identification data into de-identified data comprises encoding the personal identification data.

20. The computer implemented method of claim 15, wherein transforming the personal identification data into de-identified data comprises encrypting the personal identification data.

* * * * *

UNITED STATES PATENT AND TRADEMARK OFFICE
CERTIFICATE OF CORRECTION

PATENT NO. : 9,526,984 B2  
APPLICATION NO. : 14/086022  
DATED : December 27, 2016  
INVENTOR(S) : Thomas et al.

Page 1 of 1

It is certified that error appears in the above-identified patent and that said Letters Patent is hereby corrected as shown below:

In the Drawings

On sheet 2 of 10, in Fig. 2, Line 7, delete "RightNow" and insert -- Right Now --, therefor.

On sheet 3 of 10, in Fig. 3, under Reference Numeral 318, Line 1, delete "ACHIVED" and insert -- ACHIEVED --, therefor.

On sheet 10 of 10, in Fig. 10, under Reference Numeral 1016, Line 1, delete "BRFORE" and insert -- BEFORE --, therefor.

In the Specification

In Column 5, Line 19, delete "featute/" and insert -- feature/ --, therefor.

In Column 5, Line 20, delete "heirarchy." and insert -- hierarchy. --, therefor.

In the Claims

In Column 19, Line 19, in Claim 1, delete "qamespaces" and insert -- gamespaces --, therefor.

In Column 20, Line 38, in Claim 9, delete "qamespaces" and insert -- gamespaces --, therefor.

Signed and Sealed this  
Twentieth Day of June, 2017

Joseph Matal  
*Performing the Functions and Duties of the*  
*Under Secretary of Commerce for Intellectual Property and*  
*Director of the United States Patent and Trademark Office*